US008953281B1

(12) United States Patent
Lee et al.

(10) Patent No.: US 8,953,281 B1
(45) Date of Patent: Feb. 10, 2015

(54) HARD DISK DRIVE CASING

(71) Applicant: EchoStreams Innovative Solutions, LLC, Arcadia, CA (US)

(72) Inventors: Cheng-Chu Lee, New Taipei (TW); Gene Jingluen Lee, New Taipei (TW); Chang-Feng Chu, New Taipei (TW)

(73) Assignee: EchoStreams Innovative Solutions, LLC, Arcadia, CA (US)

( * ) Notice: Subject to any disclaimer, the term of this patent is extended or adjusted under 35 U.S.C. 154(b) by 0 days.

(21) Appl. No.: 14/171,846

(22) Filed: Feb. 4, 2014

(30) Foreign Application Priority Data

Dec. 18, 2013 (TW) .............................. 102223932 U

(51) Int. Cl.
*G11B 17/00* (2006.01)
*G06F 1/16* (2006.01)

(52) U.S. Cl.
USPC .................................. 360/99.15; 361/679.33

(58) Field of Classification Search
USPC ....................... 360/99.13, 99.14, 99.15, 99.2; 361/679.33, 679.34, 679.37
See application file for complete search history.

(56) References Cited

U.S. PATENT DOCUMENTS

| | | | | |
|---|---|---|---|---|
| 6,567,360 B1* | 5/2003 | Kagawa | ......................... | 720/609 |
| 7,903,401 B2* | 3/2011 | Lee et al. | ................. | 361/679.33 |
| 7,969,726 B2* | 6/2011 | Dai | ......................... | 361/679.37 |
| 7,983,000 B2* | 7/2011 | Chen et al. | ................. | 360/99.14 |
| 8,050,026 B2* | 11/2011 | Chang | ....................... | 361/679.33 |
| 8,305,749 B2* | 11/2012 | Lai et al. | .................. | 361/679.33 |
| 8,693,182 B2* | 4/2014 | Kuo et al. | ............... | 361/679.33 |
| 2011/0255235 A1* | 10/2011 | Chen | ........................ | 361/679.33 |
| 2014/0022723 A1* | 1/2014 | Yang et al. | ............... | 361/679.37 |

* cited by examiner

*Primary Examiner* — Brian Miller
(74) *Attorney, Agent, or Firm* — Li & Cai Intellectual Property (USA) Office

(57) ABSTRACT

A hard drive casing for accommodating a hard drive includes a case body and a cover body. The cover body has a base wall and a peripheral wall surrounding the base wall. The case body accommodates the hard drive therein. The peripheral wall has a handle arranged on an outer surface thereof. The cover body is adapted to cover the case body. The cover body is pivotally coupled to the case body. The cover body has a plurality of ribs arranged thereon. The ribs protrude towards the case body. The ribs and the base wall define a gap therebetween, and the gap has a width smaller than a thickness of the hard drive.

10 Claims, 9 Drawing Sheets

HARD DISK DRIVE CASING

BACKGROUND OF THE INVENTION

1. Field of the Invention

The instant disclosure relates to a case body for accommodating a hard disk drive or a hard drive; in particular, to a case body for depositing in a chassis.

2. Description of Related Art

Network servers and data storage equipment are essential for the provision of cloud services. Typically, hard drives are installed through the front of a server cabinet and supported by brackets in order to provide high volume of data storage and expansion. For example, the current server tower or chassis for accommodating hard drives first disposes the hard drive into a hard drive housing, then the hard drive and the housing are both inserted into the chassis for installation on support brackets.

However, hard drives are fragile electronic products that cannot withstand substantial amount of impact due to shaking and vibrations caused by gaps between the conventional hard drive housing and the hard drive. In order to enhance protection for multiple hard drives, the hard drive casings aim to have the most preferred stability in accommodating the hard drive and shock-resistant characteristics.

To address the above issues, the inventor strives via associated experience and research to present the instant disclosure, which can effectively improve the limitation described above.

SUMMARY OF THE INVENTION

The object of the instant disclosure is to improve upon structural strength and excessively time-consuming installation between hard disk drives and hard disk drive casings.

In order to achieve the aforementioned objects, according to an embodiment of the instant disclosure, a hard drive casing for accommodating a hard disk drive includes a case body and a cover body. The case body has a base wall and a peripheral wall surrounding the base wall. The case body accommodates the hard drive therein. The peripheral wall has a handle arranged on an outer surface thereof. The cover body is adapted to cover the case body. The cover body is pivotally coupled to the case body. The cover body has a plurality of ribs arranged thereon. The ribs protrude towards the case body. The ribs and the base wall define a gap therebetween, and the gap has a width smaller than a thickness of the hard drive.

The instant disclosure has the following improvements. The cover body has ribs protruding inwards such that the ribs can abut and securely fix the hard drive in the hard drive casing.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1:
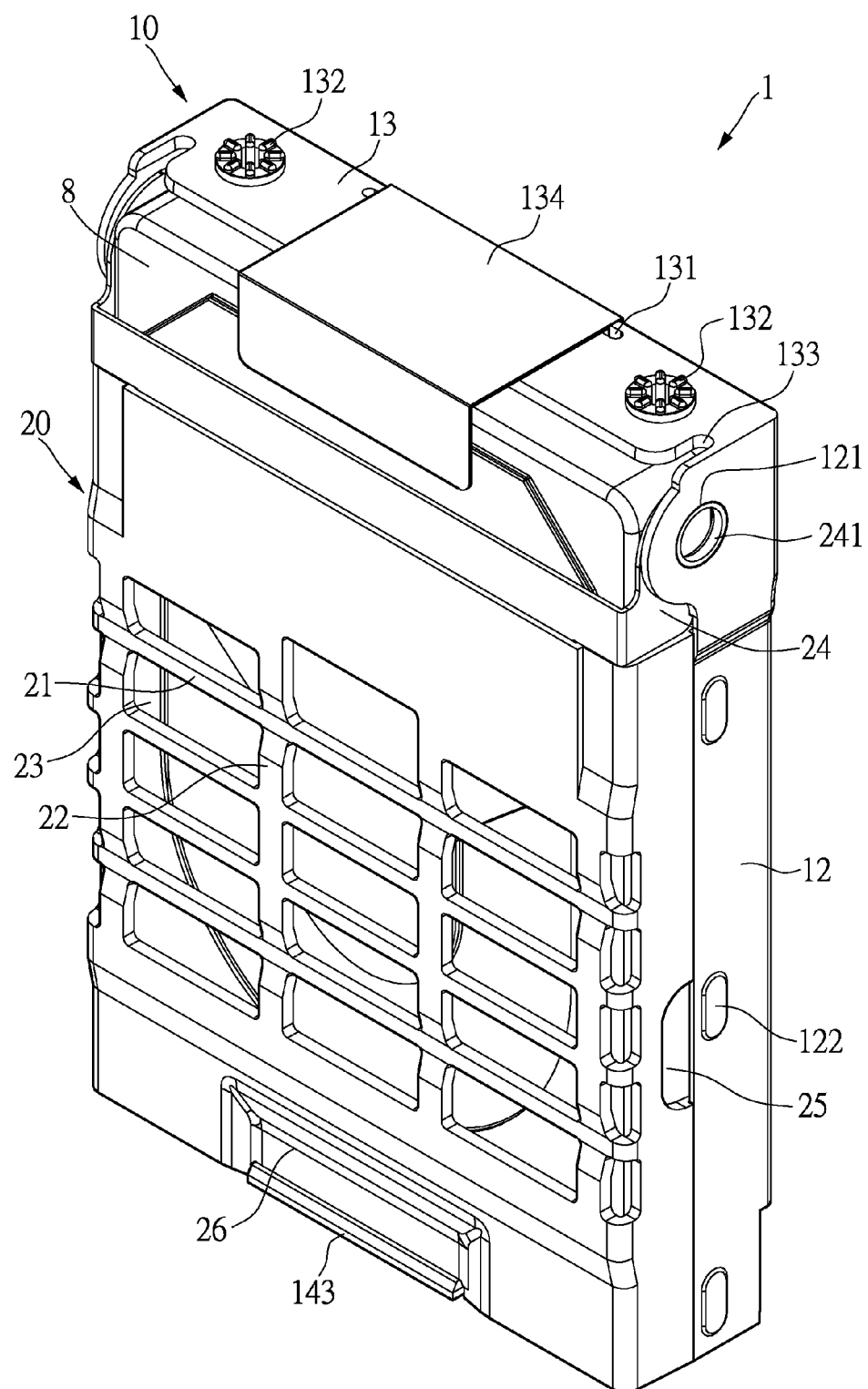
FIG. 1 is a perspective view of a hard drive casing in accordance with the instant disclosure.
Figure 9:
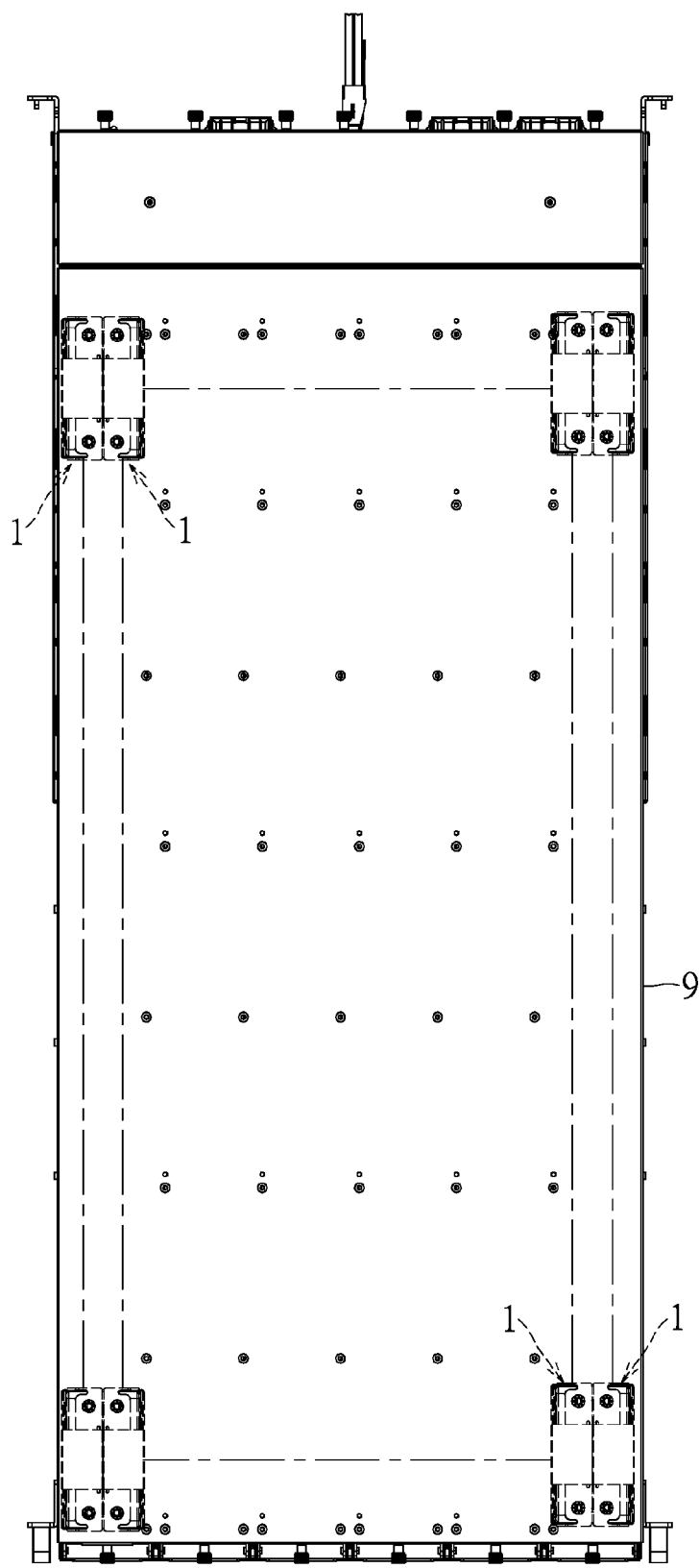
FIG. 9 is a schematic diagram illustrating the hard drive casing in a server case body in accordance with the instant disclosure.

As shown in FIG. 1, the instant disclosure provides a hard drive casing 1 for accommodating a hard drive 8 therein, such that the hard drive 8 can be securely installed in a server case body 9 (As shown in FIG. 9). As shown in FIG. 1, the hard drive casing 1 includes a case body 10 and a cover body 20. The cover body 20 is pivotably coupled to and covers the case body 10. The hard drive 8 can be disposed in the case body 10, and the cover body 20 secures the hard drive 8 in the case body 10.

Figure 2:
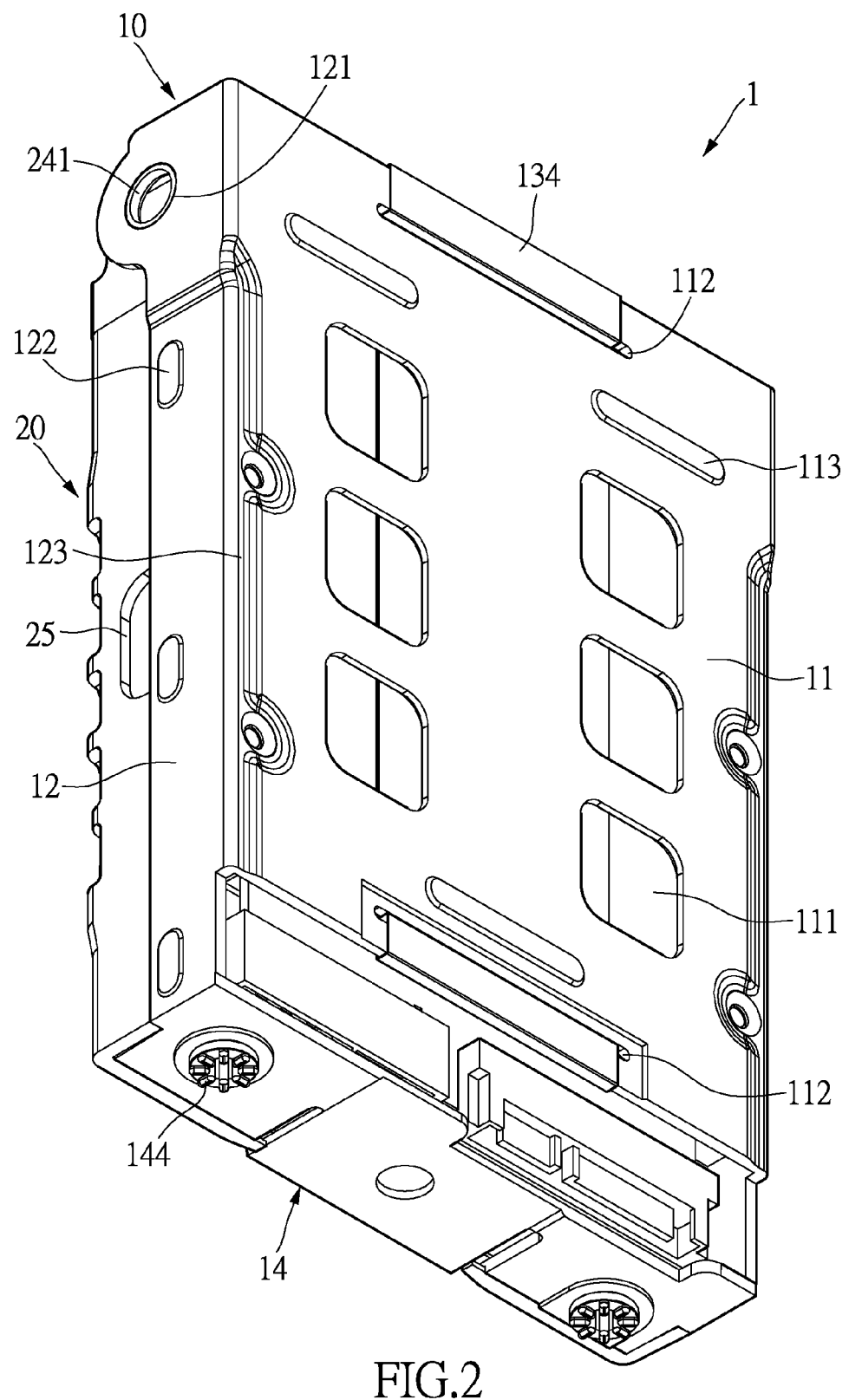
FIG. 2 is another perspective view of the hard drive casing in accordance with the instant disclosure.
Figure 3:
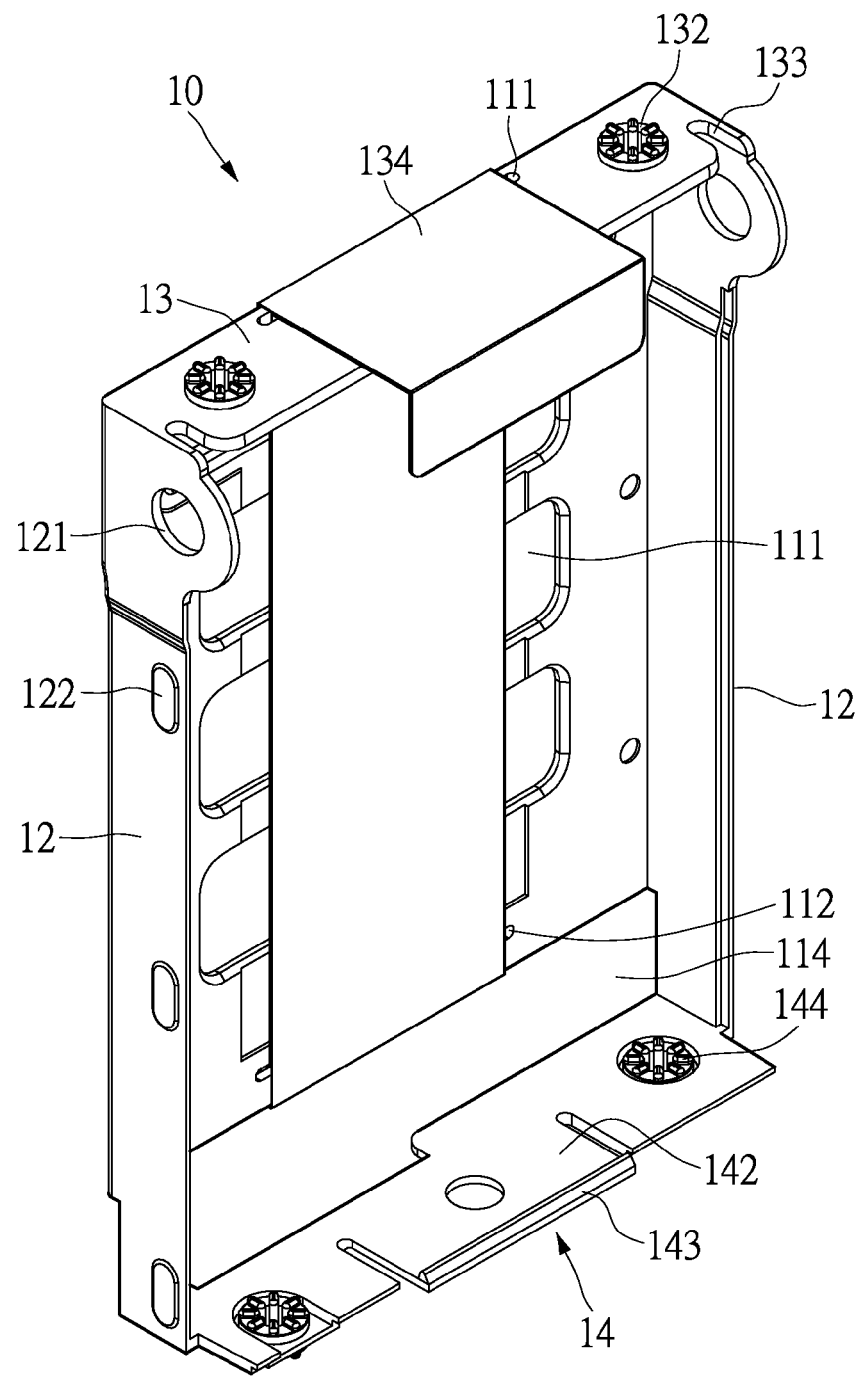
FIG. 3 is a perspective view illustrating a case body of the hard drive casing in accordance with the instant disclosure.

As shown in FIGS. 2 and 3, the case body 10 is formed by a base wall 11 and a peripheral wall arranged around the base wall 11, such that the case body 10 resembles a case-like body without a cover. The peripheral wall surrounding the base wall 11 is divided into two pivoting walls 12, a pull-wall 13 and a coupling wall 14. As shown in FIG. 3, the two pivoting walls 12 are two oppositely faced sidewalls, the pull-wall 13 is an upper wall, and the coupling wall 14 is a lower wall as shown in figures. However, the upper, lower, oppositely faced directions only serve as references for the disclosure of the embodiments and do not limit the actual scope of the instant disclosure.

The base wall 11 has a plurality of vent openings 111, two slots 112, a plurality of protruding pads 113, and a through opening 114. The vent openings 111 are arranged proximate to a center portion of the base wall 11 and penetrate through the base wall 11 for dissipating heat from the hard drive 18. The through opening 114 is arranged on the base wall 11 proximate to an end of the coupling wall 14, such that the base wall 11 and the coupling wall 14 are not directly connected. One of the slots 112 is arranged on the base wall 11 proximate to the through opening 14 and penetrates through the base wall 11. The other slot 112 is arranged on the base wall 11 proximate to the pull-wall 13 and penetrating through the base wall 11. The protruding pad 113 is disposed on an outer surface of the base wall 11.

Each pivoting wall 12 has a pivot opening 121 arranged thereon. The pivot openings 121 of the two pivoting walls 12 are coaxially arranged, such that a common axis of the pivot openings 121 are arranged parallel to the pull-wall 13. The pivoting wall 12 also includes a plurality of protruding pads 122 arranged on an outer surface of the pivoting wall 12. The two pivoting walls 12 and the base wall 11 have a portion connected to one another. The portion connecting the two pivoting walls 12 and the base wall 11 has a fixing slot 123 formed thereat.

The pull-wall 13 has a mounting slot 131, a plurality of shock absorbing pads 132, two slits 133, and a flexible sheet 134 arranged thereon. The mounting slot 131 penetrates through the pull-wall 13 and is arranged on the pull-wall 13 proximate to two ends of the base wall 11. The two slits 133 are respectively arranged on the pull-wall 13 proximate to two ends of the two pivoting walls 12. The slit 133 is a groove inwardly formed at a peripheral portion of the pull-wall 13. The shock absorbing pad 132 is made of elastically shock absorbing materials. The shock absorbing pad 132 is disposed on the pull-wall 13 exposing from an outer surface and an inner surface thereof. As shown in FIG. 1, the flexible sheet 134 passes through the mounting slot 131 along the pull-wall 13. As shown in FIG. 3, the flexible sheet 134 passes through the through opening 114 along an inner surface of the base wall 11. As shown in FIG. 2, after passing through the through opening 114, the flexible sheet 134 is bent to wrap around the outer surface of the base wall 11 and passes through the slot 112 proximate to the through opening 114. The flexible sheet 134 extends along the inner surface of the base wall 11 towards the pull-wall 13, and passes through the slot 112 proximate to the pull-wall 13. As shown in FIGS. 1 and 2, the flexible sheet 134 is bent and extended from the outer surface of the base wall 11 to the outer surface of the pull-wall 13. The pull-wall 13 has two layers of flexible sheets 134 arranged thereon. An end distal from the base wall 11 of flexible sheet 134 extends towards the coupling wall 14. Specifically, the flexible sheet 134 resembles the shape of the number "7", or the silhouette of a hook. The flexible sheet 134 abuts the base wall 11 along its longitudinal side. A mid-section of the flexible sheet 134 corresponds to the shape of the pull-wall 13, such that the flexible sheet 134 becomes a handle for users to pull on for extraction of the hard drive casing 1. Moreover, since the material of the flexible sheet 134 and the respective physical structure resembles the number "7", the flexible sheet 134 can be flexed appropriately to save space when disposed in the server case body 9.

Moreover, the coupling wall 14 separately forms a flexible arm 142 and the free end of the flexible arm 142 inwardly protrudes to form a clipping portion 143. An outer surface of the coupling wall 14 has two shock absorbing pads 144 arranged thereon. The shock absorbing pads 144 are made of the same materials and provide similar shock absorbent properties as the aforementioned shock absorbing pads 132.

Figure 4:
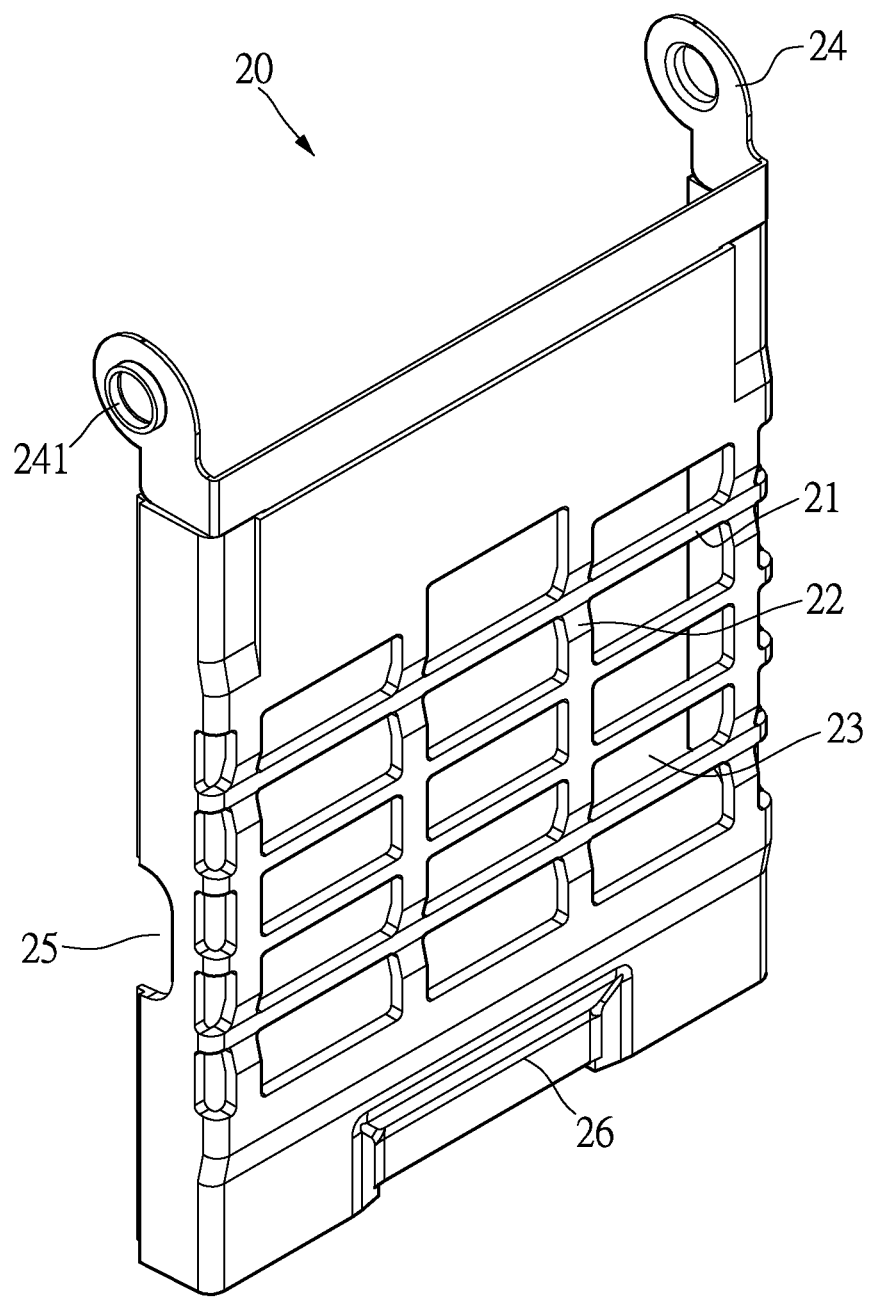
FIG. 4 is a perspective view illustrating a cover body of the hard drive casing in accordance with the instant disclosure.
Figure 5:
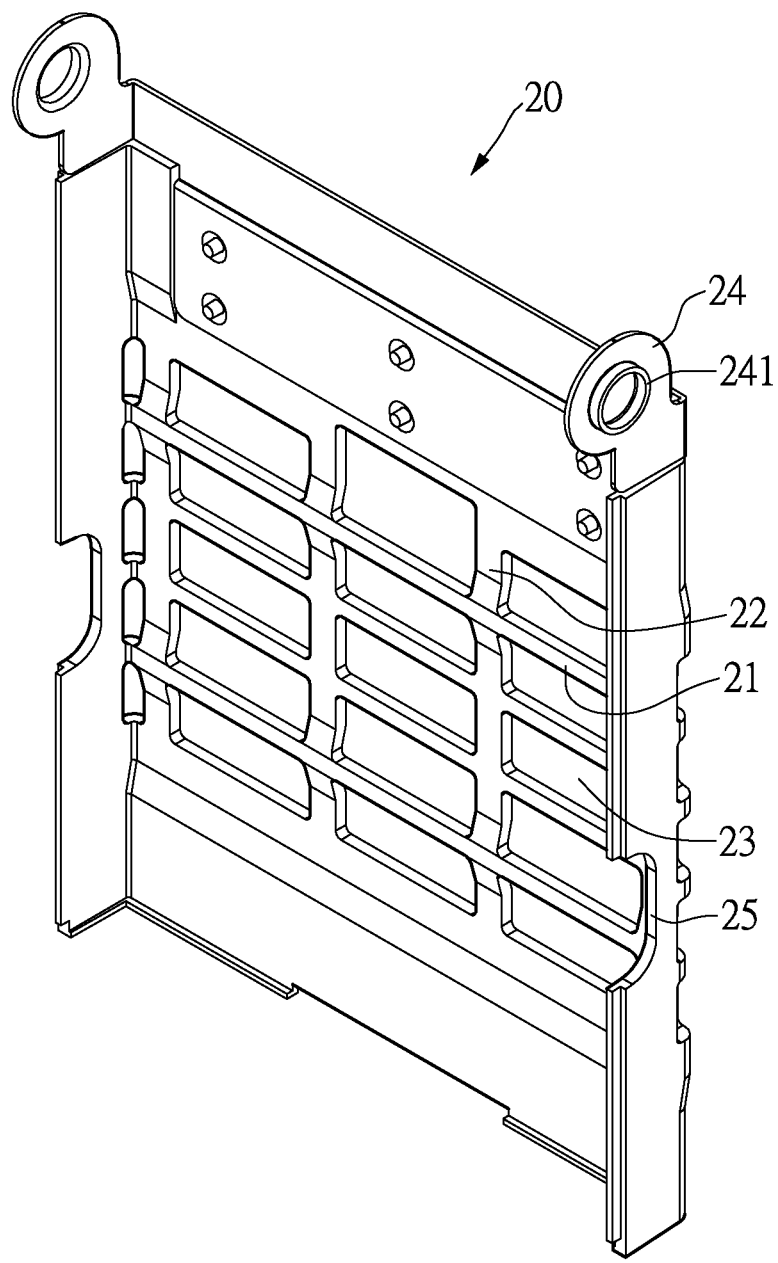
FIG. 5 is another perspective view illustrating the cover body of the hard drive casing in accordance with the instant disclosure.

As shown in FIGS. 1, 4, and 5, the cover body 20 has a plurality of ribs 21 and a plurality of connecting ribs 22 arranged at a central portion of the cover body 20. The ribs 21 and the connecting ribs 22 are arranged in a crisscross configuration to define a plurality of vent openings 23. As shown in FIG. 5, the ribs 21 inwardly recess with respect to the hard drive casing 1. In other words, the ribs 21 protrude from a flat inner surface of the cover body 20.

As shown in FIGS. 1, 4, and 5, the cover body 20 includes a pivoting arm 24 arranged at each of the two side portions thereof corresponding to the pivoting wall 12. The pivoting arm 24 is flat shaped and has a thickness smaller than a width of the aforementioned slit 133. The width of the slit 133 is defined as the transverse direction with respect to the formation direction of the slit 133. In the instant embodiment, each of the two pivoting arms 124 has a hollow shaft 241 arranged on an externally facing surface of the pivoting arm 124. The hollow shaft 241 has an outer diameter smaller than an inner diameter of the pivot opening 121. The hollow shaft 241 extends outwardly and is adapted to correspond between the cover body 20 and the case body 10. The cover body 20 corresponds to a side of the coupling wall 14. The cover body 20 has a coupling groove 26 arranged thereon. The coupling groove 26 inwardly recesses on an outer surface of the cover body 20 with respect to the hard drive casing 1. The coupling groove 26 has a width corresponding to the clipping portion 143. The width of the coupling groove 26 is defined as the transverse direction with respect to the formation direction of the coupling groove 26. As shown in FIGS. 1 and 4, the two side portions of the cover body 20 corresponding to the pivoting wall 12 respectively include a groove 25 arranged proximate to the coupling groove 26. Users can press against portions of the cover body 20 defining the groove 25 for handling of the cover body 20. The design of the groove 25 is intended to not affect the overall volume of the hard drive casing 1.

Figure 6:
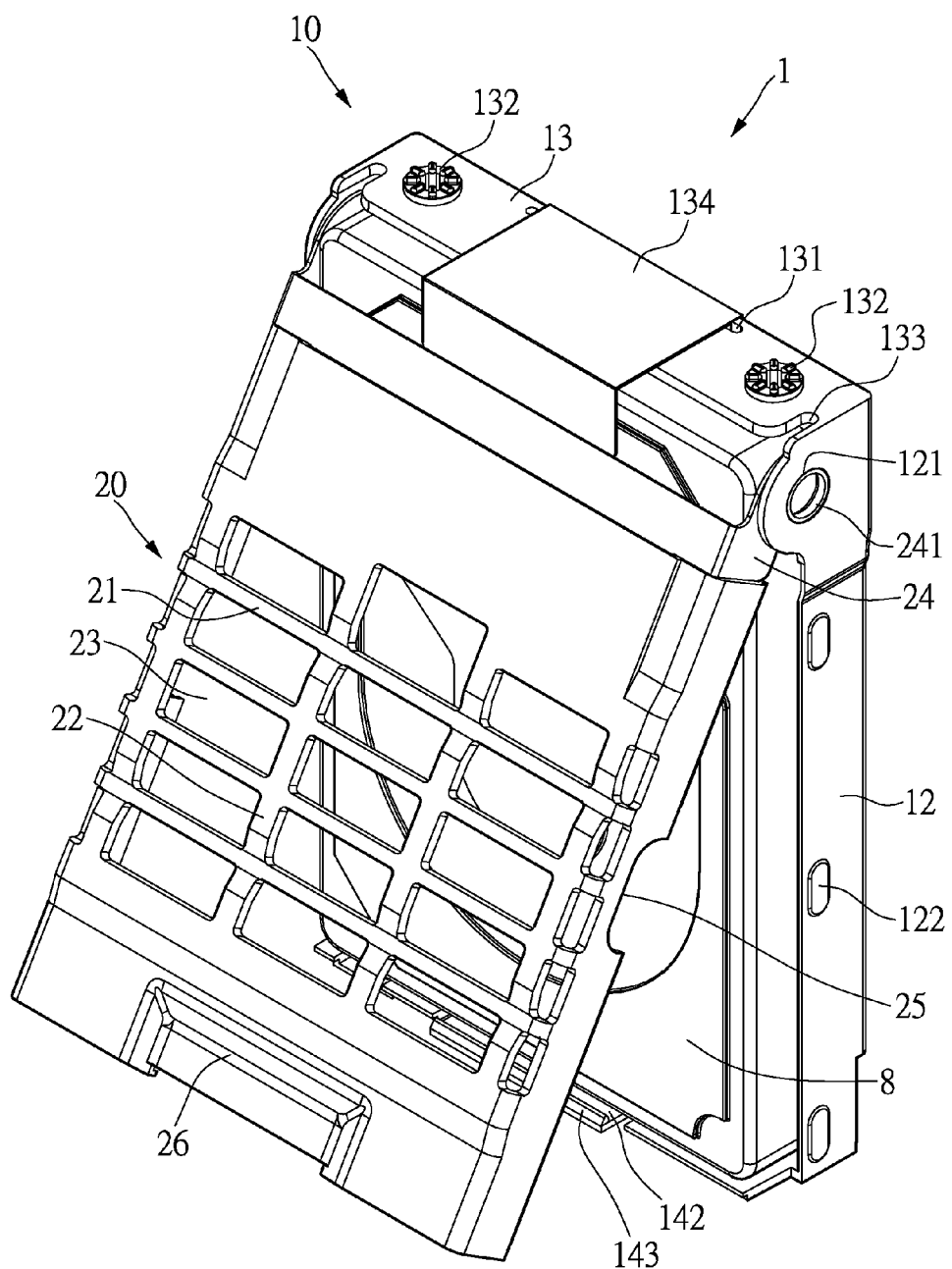
FIG. 6 is a perspective view illustrating a partially opened mode of the hard drive casing in accordance with the instant disclosure.
Figure 7:
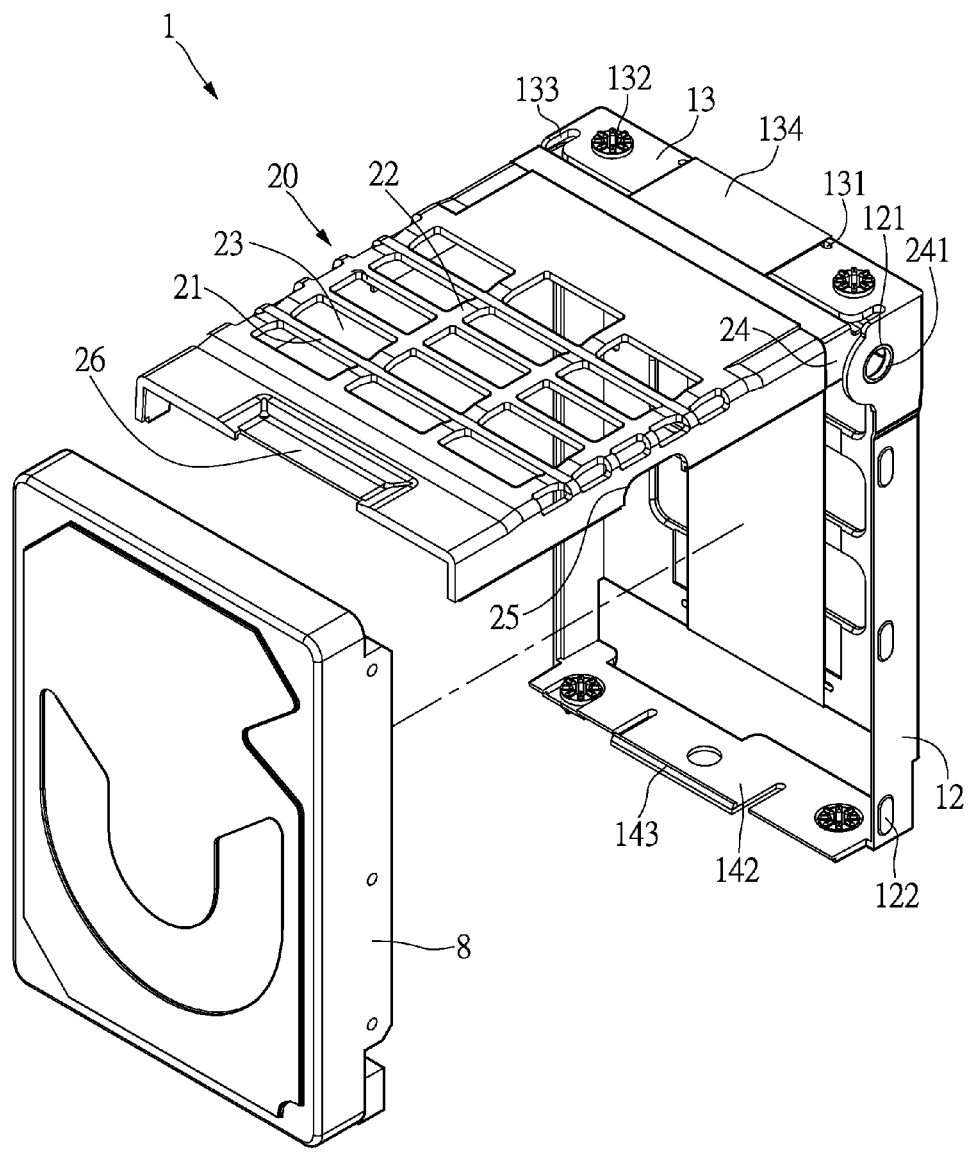
FIG. 7 is a perspective view illustrating a fully opened mode of the hard drive casing in accordance with the instant disclosure.

As shown in FIGS. 1, 6 and 7, the cover body 20 is configured to cover the case body 10 and the pivoting arm 24 abuts an inner surface of the pivoting wall 12. The hollow shaft 241 passes through the pivot opening 121 from the inner surface to the outer surface of the pivoting wall 12, such that the cover body 20 can rotate with respect to the case body 10 about the two hollow shafts 241 as rotational axles. As aforementioned, the outer diameter of hollow shaft 241 is slightly smaller than the inner diameter of the pivot opening 121 such that the hollow shaft 241 can freely rotate in the pivot opening 121. Moreover, the hollow shaft 241 can also include a wall (not shown in figures) radially extended at a free end of the hollow shaft 241 to limit the relative positions between the hollow shaft 241 and the pivoting wall 12. The hollow shaft 241 replaces the traditional pivotally connected metal axle to reduce some essential elements, the overall volume, and the overall weight of the hard drive casing 1, such that the overall volume of the hard drive casing 1 as well as the hard drive 8 are substantially the same. The pivoting arm 24 abuts the inner surface of the pivoting wall 12, such that the cover body 20 is reduced in size, and in turn, the overall volume of the hard drive casing 1 is also reduced.

As aforementioned, the hollow shaft 241 is correspondingly arranged according to the relative configuration of the case body 10 and the cover body 20. When the pivoting arm 24 abuts the outer surface of the pivoting wall 12, the hollow shaft 24 extends inwardly.

As shown in FIG. 1, the case body 10 couples to or clips to the coupling groove 26 via the clipping portion 143. The case body 10 also flexibly abuts a base surface of cover body 20 defining the coupling groove 26 via the flexible arm 142 such that the cover body 20 can couple or clip to the case body 10, at which state, the hard drive casing 1 is closed.

When the hard drive 8 is disposed in the case body 10 and the cover body 20 is clipped or snapped to the case body 10, the ribs 21 inwardly recess with respect to the cover body 20 such that a gap is formed between the ribs 21 and the base wall 11, and the distance of the gap is relatively smaller than a thickness of the hard drive 8. The ribs 21 can flexibly abut the surface of the hard drive 8 such that the hard drive 8 is clamped between the cover body 20 and the case body 10. In turn, the hard drive 8 is securely disposed in the hard drive casing 1. Moreover, the hard drive 8 and the hard drive casing 1 are less prone to damages due to physical impact with respect to one another.

As shown in FIGS. 6 and 7, when the clipping portion 143 is removed from the base surface of the cover body 20 defining the coupling groove 26, the hard drive casing 1 is in an open state, such that users can rotate the cover body 20 by maneuvering the groove 25. As shown in FIG. 6, when the cover body 20 is slightly open, the hard drive 8 cannot be removed from the case body 10. As shown in FIG. 7, when the cover body 20 is completely open, the hard drive 8 can be removed from the case body 10, and the pivoting arm 24 of the cover body 20 can be partially accommodated in the slit 133 such that the cover body 20 has even larger rotational angle. The opening and closing maneuvering between the cover body 20 and the case body 10 is operated via the coupling arrangement between the coupling groove 26, the clipping portion 143, and the flexible arm 142 to replace the conventional method of screws and screw holes, such that the hard drive case 1 can be opened and closed in order to facilitate the deposition and removal of the hard drive 8 without tools. As a result, the overall handling process is more convenient and efficient. In addition, since screws are not used in the instant embodiment, the overall volume and weight of the hard drive case 1 are reduced.

Figure 8:
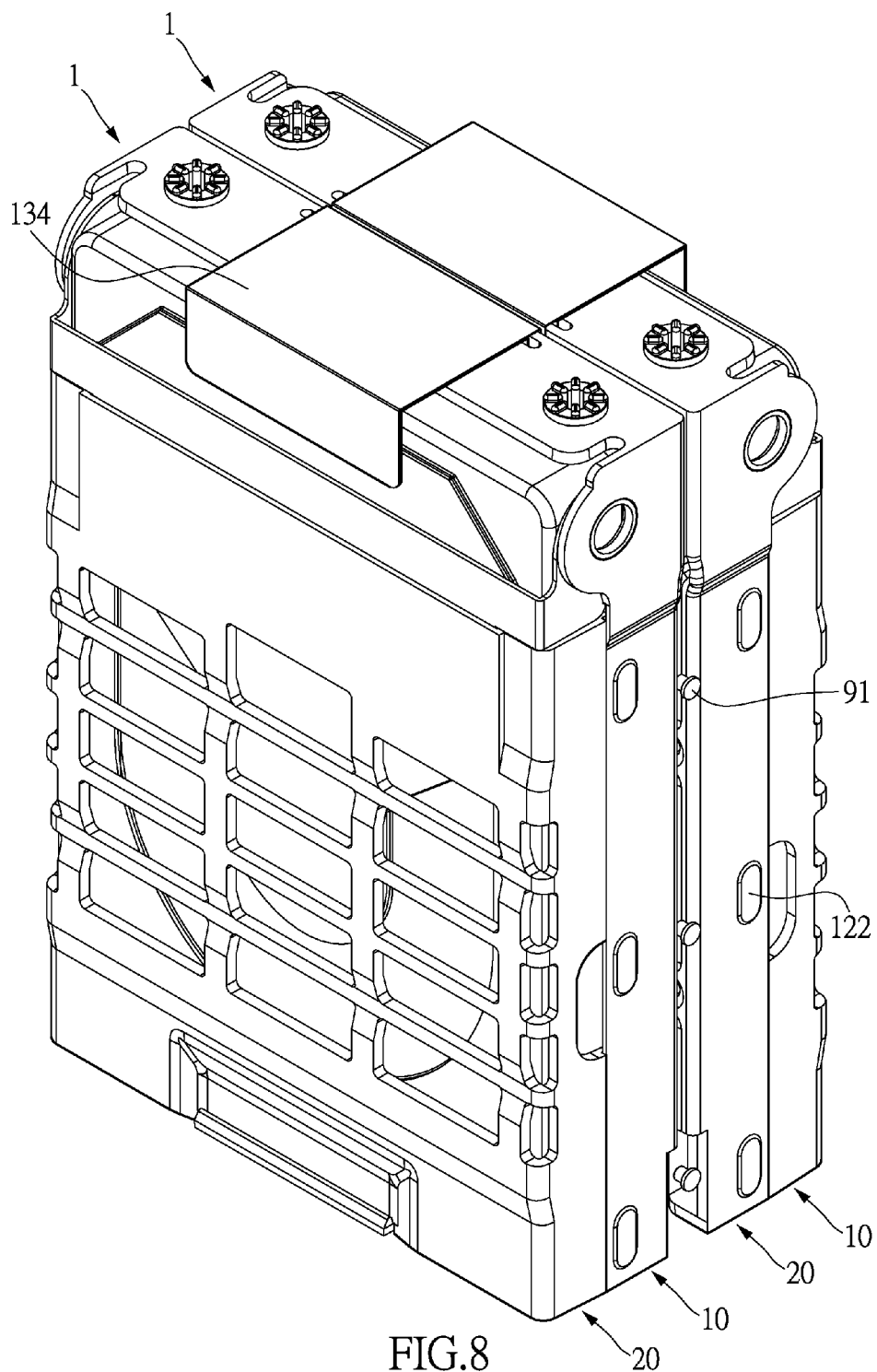
FIG. 8 is a perspective view illustrating two hard drive casing arranged side by side in accordance with the instant disclosure.

As shown in FIGS. 2, 8 and 9, two hard drive cases 1 are configured in an array in a server case body 9, in which the two hard drive cases 1 are configured as a group. The base walls 11 of the two hard drive cases 1 are arranged side by side in parallel, the coupling wall 14 is arranged to face downwards, and the pull-wall 13 is arranged to face upwards to facilitate the deposition and removal of the hard drive case 1 via the flexible sheet 134. The base walls 11 and the pivoting wall 12 respectively have a plurality of protruding pads 113, 122 that prevent the outer surfaces of the base walls 11 from abutting one another, such that the hard drive casing 1 can be fixed in place and heat from the hard drive 8 can be dissipated via the vent openings 111. With the shock absorbing pads 132, 144 arranged on the outer surfaces of the coupling wall 14 and the pull-wall 13, the hard drive casing 1 is less prone to shock due to vibrations originating from the server case body 9. In addition, when the sizes of the hard drive 8 and the hard drive casing 1 are incompatible, the shock absorbing pads 132, 144 can be used to adjust the gap therebetween.

As shown in FIG. 2, the pivoting wall 12 of the case body 10 and a connecting portion of the base wall 11 each has a fixing slot 123. As shown in FIG. 8, when two hard drive casings 1 are arranged in parallel side by side along the base walls 11, a relatively narrow opening is formed between the fixing slots 123. As shown in FIGS. 8 and 9, the server case body 9 can have a plurality of fixing pins 91. When the hard drive casing 1 is disposed in the server case body 9, the fixing pins 91 respectively abut the walls of the pivoting wall 12 defining the fixing slots 123 to guide the relative position of the hard drive casing 1 with respect to the server case body 9. The fixing pins 91 are arranged in the narrow opening between the two case bodies 10, such that the two hard drive casings 1 can still be in contact while not affecting the overall depository volume in the server case body 9. The fixing pins 91 only serve as an example of a guiding mechanism between the hard drive casing 1 and the server case body 9. The guiding mechanism can also be a guiding board or a guiding post (both not shown in figures), and is not limited herein.

In summary, the hard drive casing of the instant disclosure provides the following improvements. The cover body has ribs protruding inwards such that the ribs can securely fix the hard drive in the hard drive casing without screws and also simplify assembly process of the hard drive and the hard drive casing. The clipping portion and the coupling groove cooperatively facilitate the opening and closing of the cover body and the case body via clipping or snapping to replace the conventional fixing method of screws and screw holes, such that the deposition and removal of the hard drive is relatively more convenient and assembly time is reduced since no tools are required for assembly. With the flexible sheet conformingly bends to the shape of the case body and resembles the shape of the number "7" for the use of a handle, the overall volume of the hard drive casing is not affected. The rotational angle of the cover body is increased due to the configuration between the pivoting arms coupled to two side walls and the slits. With the hollow shafts protruding outwardly and passing through the pivot openings, the overall volume of the hard drive and the hard drive casing are relatively the same. The shock absorbing pads provide the most preferred spacing between the hard drive and hard drive casing. Also, the hard drive and the hard drive casing are less likely to be affected by vibrations from the surrounding environment (such as the server case body) and. Moreover, the installation position of the hard drive casing can be guided with the fixing slots without occupying the overall volume of the surrounding environment. Furthermore, the protruding pads provide positioning between multiple hard drive casings.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A hard disk drive casing for accommodating a hard disk drive having a thickness, comprising:
   a case body having a base wall and a peripheral wall peripherally arranged around the base wall, the hard drive accommodated in the case body, the peripheral wall having an outer surface and a handle arranged on the outer surface; and
   a cover body disposed on the case body, the cover body pivotably coupled to the case body, the cover body having a plurality of ribs arranged thereon, the ribs protruding towards the direction of the case body, the ribs and the base wall arranged spaced apart with a gap therebetween, and the gap being smaller than the thickness of the hard drive.

2. The hard disk drive casing as recited in claim 1, wherein the cover body has portions defining a coupling groove at a side of the cover body, the case body has a flexible arm and a clipping portion arranged on a surface of the case body corresponding to the coupling groove, the clipping portion is arranged on a free end of the flexible arm, the clipping portion abuts a portion of the cover body defining the coupling groove.

3. The hard disk drive casing as recited in claim 2, wherein the case body includes a flexible sheet, the flexible sheet resembles substantially the shape of a hook extending from the base wall of the case body to the outer surface of the peripheral wall, the flexible sheet is as the handle.

4. The hard disk drive casing as recited in claim 3, wherein the base wall of the case body resembles a rectangle, the cover body is pivotably coupled to a pair of side walls of the peripheral wall, each of the side walls has a pivot opening arranged thereon, the cover body has a pivoting arm arranged thereon corresponding to the pivot opening, the pivoting arms are pivotably coupled to the pair of side walls via the pivot openings, the peripheral wall has a pair of slits arranged on a portion thereof corresponding to the pivoting arms, and the peripheral wall has an outer surface and an inner surface.

5. The hard disk drive casing as recited in claim 4, wherein the peripheral wall proximate to the pair of side walls has a plurality of shock absorbing pads arranged therein, the shock absorbing pads are exposed from an outer surface of the peripheral wall.

6. The hard disk drive casing as recited in claim 5, wherein the shock absorbing pas are exposed from the inner surface of the peripheral wall.

7. The hard disk drive casing as recited in claim 6, wherein the base wall of the case body and the pair of side walls respectively have an outer surface, each of the pair of side walls has an inner surface, the outer surfaces of the base wall and the pair of side walls have a plurality of protruding pads arranged thereon.

8. The hard disk drive casing as recited in claim 7, wherein two sides of the cover body each have a groove arranged thereon.

9. The hard disk drive casing as recited in claim 8, wherein the pivoting arm has a hollow shaft protruding away from the pivoting arm, the hollow shaft has an outer diameter smaller than an inner diameter of the pivot opening, the pivoting arm abuts the inner surface of the pair of side walls, the hollow shaft passes through the pivot opening.

10. The hard disk drive casing as recited in claim 9, wherein the cover body and the base wall of the case body have a plurality of vent openings arranged on.

\* \* \* \* \*